Nov. 2, 1926.  1,605,220
L. CUVILLIER ET AL
APPLIANCE FOR HOUSING AND HANDLING MOTOR CARS
Filed Oct. 6, 1925   3 Sheets-Sheet 1
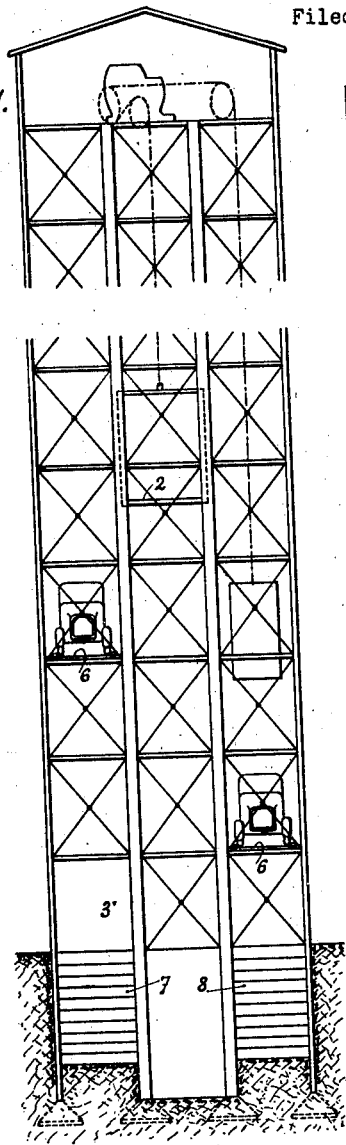
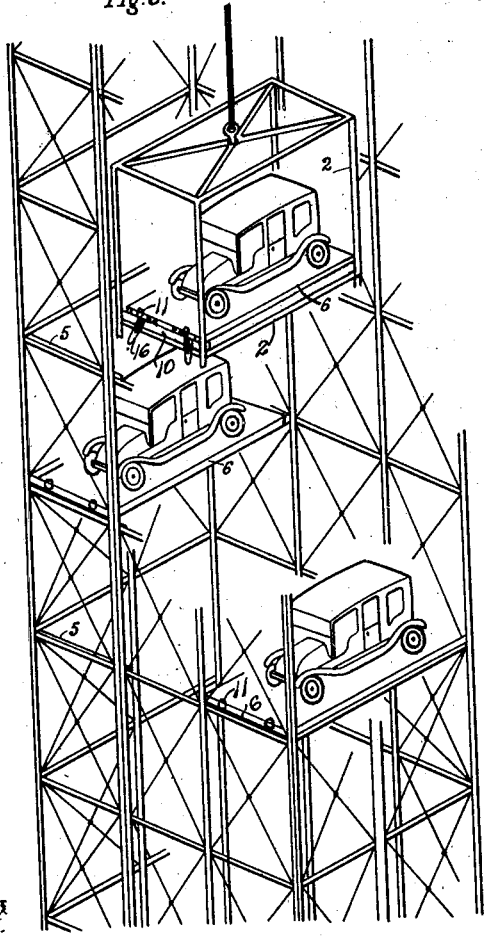
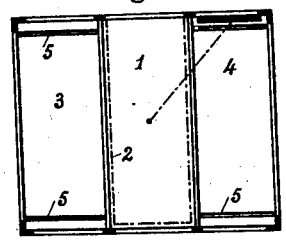
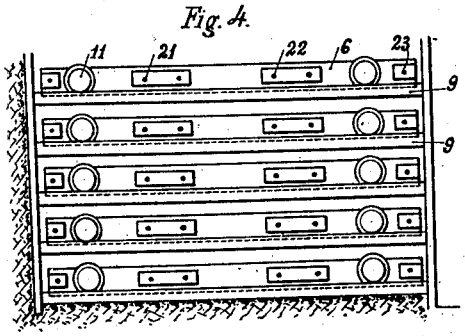

Nov. 2, 1926.
1,605,220
L. CUVILLIER ET AL
APPLIANCE FOR HOUSING AND HANDLING MOTOR CARS
Filed Oct. 6, 1925    3 Sheets-Sheet 2
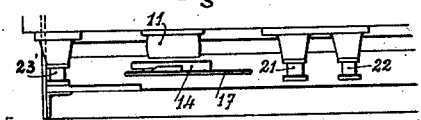
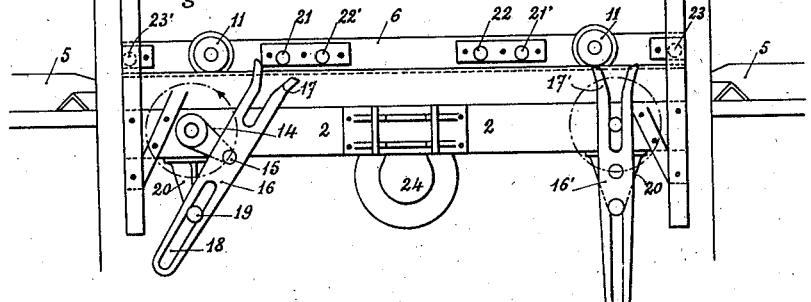
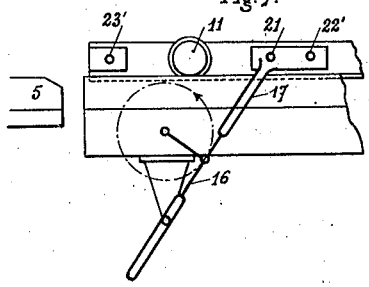
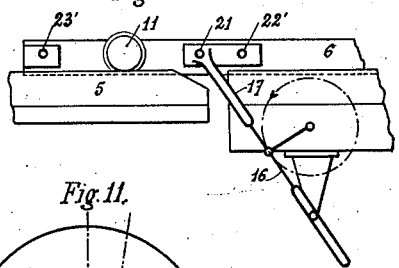
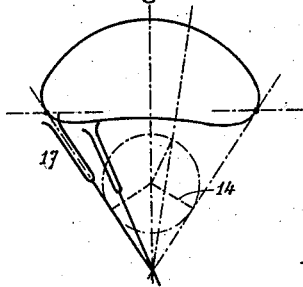
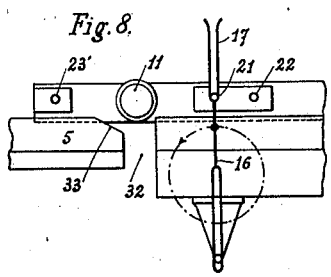
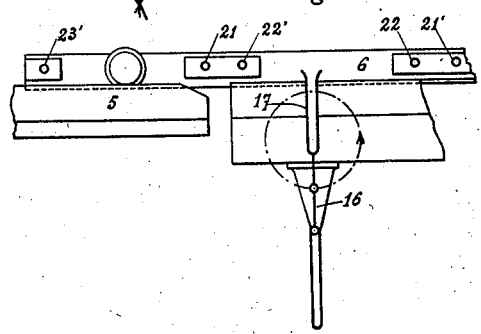

Nov. 2, 1926.
1,605,220
L. CUVILLIER ET AL
APPLIANCE FOR HOUSING AND HANDLING MOTOR CARS
Filed Oct. 6, 1925   3 Sheets-Sheet 3
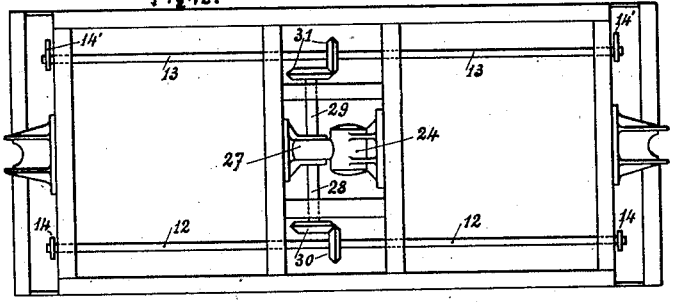
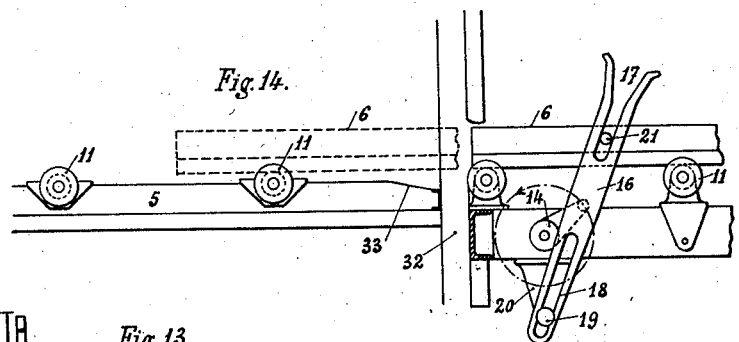
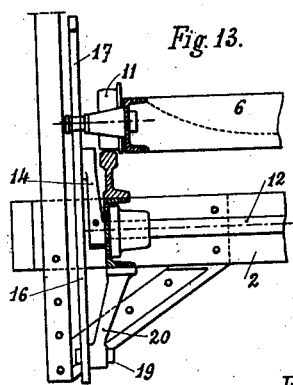
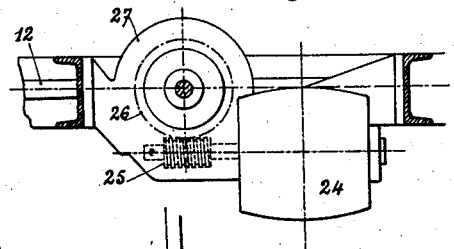
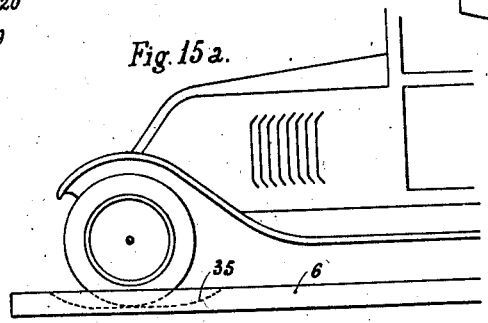
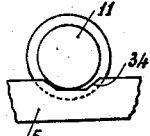

Patented Nov. 2, 1926.

1,605,220

UNITED STATES PATENT OFFICE.

LUCIEN CUVILLIER, OF REIMS, AND HUBERT STERN, OF PARIS, FRANCE.

APPLIANCE FOR HOUSING AND HANDLING MOTOR CARS.

Application filed October 6, 1925, Serial No. 60,723, and in France June 17, 1925.

Our invention relates to garages for motor cars and more particularly to garages of the kind comprising a number of floors arranged one above the other, intended for erection in large cities where the space is too valuable to provide extensive garages covering a large ground area.

Garages of this kind generally consist of superimposed sets of stalls, or compartments, each being adapted to accommodate one vehicle, said stalls either radiating from a central elevator shaft, or being arranged in a rectangular space about an elevator shaft, or in two rows at each side of an alleyway having an elevator at each end, means being provided for moving the cars from the elevator into any stall of each set.

One method of moving the cars to, and removing them from the stalls or compartments in which they are to be stored, consists in the use of movable platforms, or trucks, adapted to move on rollers or along a track, means being provided at each floor to move said platforms on their rollers or along the tracks. To arrange one mechanism for moving the platforms at each floor of the garage involves considerable expense and moreover necessitates the presence of one or more operators at each floor.

The object of the present invention is in a garage of the kind referred to, to save expense, time and labor, which object we accomplish by doing away with the individual mechanism at each floor and providing a single trans-shipment mechanism in the elevator, so that all the platforms can be mechanically operated from the ground by a single attendant.

To this end, the garage according to our invention, is built up in tower form and comprises two sets or rows of superposed stalls or compartments only, one on each side of the elevator shaft, and a pair of rails are arranged in each compartment and in the elevator respectively to support one platform. A trans-shipment mechanism, including an electric motor, is built in the bottom part of the elevator for moving the platforms on the rails to and from the compartments, said trans-shipment mechanism being operated by the attendant from the ground.

One specific form of the trans-shipment mechanism comprises, briefly speaking, four crank-operated, forked driving levers arranged in pairs in a vertical plane on each side of the elevator and corresponding driving fingers on the sides of the platforms, which are engaged by the forked end of the levers during their working stroke and disengaged from said driving levers during the return-stroke of the levers.

In the accompanying drawings:

Fig. 1 is a diagrammatic view of the whole garage;

Fig. 2 is a plan of Fig. 1;

Fig. 3 a partial perspective view of Fig. 1, on an enlarged scale;

Fig. 4 is a detail view of the lower portion of Fig. 1;

Fig. 5 shows a construction of the trans-shipment mechanism for the platforms, mounted in the cage of the lift;

Fig. 6 is a detail view of Fig. 5 in plan;

Figs. 7 to 9 are diagrams showing the operating lever of the trans-shipment mechanism respectively in starting, central and end position. Fig. 10 shows the lever after one-half of its return-stroke, while Fig. 11 diagrammatically illustrates the curve described by the end of the operating lever during one complete operating stroke and its return-stroke.

Fig. 12 is a plan of the elevator, showing the drive of the trans-shipment mechanism illustrated in Fig. 5;

Figs. 13 and 13ª are detail views of the said drive;

Fig. 14 shows a modified construction of Fig. 5;

Figs. 15 and 15ª show two safety devices respectively for holding the front car wheels on the platform and for holding the latter in place when at rest.

According to Figs. 1 to 3, the garage comprises a vertical metal framework of rectangular cross section (see Fig. 2) the central portion of which forms the shaft 1 for an elevator 2, whilst the lateral portions 3 and 4 are intended to receive cars arranged one above the other. As shown in Fig. 2 the cross section of this frame work is very small, since it merely corresponds to the area occupied by three cars arranged side by side. The height of the entire frame work is limited only by practical considerations. The frame work is divided in vertical direction into superposed floors, and at each floor there is provided a pair of rails or joists 5 on which are to be placed by means of a trans-shipment mechanism provided in the elevator, removable platforms 6, adapted to support a car and said platform being raised to the level of the rails by the elevator 2. The platforms which are not occupied by a car, can either be left empty at their respective floors, or housed in storage-spaces or storage chambers 7 and 8 provided preferably in the basement, in which these platforms will be placed on superposed rails 9 (Fig. 4) similar to the rails 5 of the floors.

It will be seen from Fig. 1 that the invention enables a considerable number of cars to be housed in a vertical direction on a minimum area. Figures 1 and 3 show clearly, without requiring any description, how the storing or housing of the cars is done; it being entirely mechanical from the moment a car has been brought into the starting compartment 3' which is at one of the sides of the elevator shaft.

The various floors need not necessarily be provided with flooring, but the whole frame work will be if necessary, covered with a roof and surrounded by masonry such as brick or other, with glazed windows.

Like the stories of the frame work, the floor of the elevator cage is provided with a pair of rails 10 (Figs. 5 and 6) on which travels the movable platform 6 provided with rollers 11.

The mechanism for the trans-shipment of said platforms from the elevator 2 to the fixed rails 5 of the frame work, and conversely, comprises the shafts 12 and 13 arranged parallel at each side of the longitudinal axis of the elevator car; to each of the two ends of these shafts are keyed cranks 14, the crank pin 15 (Fig. 5) of which operates a rocking lever 16, the upper part of which has the shape of a fork 17, while the bottom part is provided with a slot 18 sliding on a fixed pin 19 secured to a bracket 20. On each side of the platform 6 is provided a series of six driving fingers or pins arranged in two groups of three: those 21, 22 and 23 of the first group are intended to co-operate with the bifurcated levers 16 for operating the platform at one side of the elevator, and those 21' 22' and 23' of the second group co-operate with the lever 16' for manœuvering the platform at the other side of the elevator.

The two shafts 12 and 13 are driven independently of each other by a reversible electric motor 24 mounted under the floor of the elevator; this motor drives by means of a suitable gear, for instance, worm gear 25, 26 (Fig. 13) the disc of a double magnetic clutch 27, by means of which one or the other of counter shafts 28 or 29 (Fig. 12) can be thrown into gear; the said counter shafts, by means of pairs of bevel wheels 30 and 31 transmit the movement to the shafts 12 and 13 respectively, operating the bifurcated levers 16 and 16'.

The operation is as follows:

Assuming that it is the question of trans-shipping or transferring the platform (Fig. 5) placed into the elevator car, to the fixed rails 5 shown on the left hand side in this figure. The magnetic clutch 27 is operated so as to throw into gear only the two shafts 28 and 12, and the motor 24 is started in a suitable direction of rotation, so that the cranks 14 shall rotate in the direction of the arrow shown in Fig. 5.

At the moment when the lever 16 is in its extreme right hand position (Fig. 7), the fork 17 is about to seize the driving finger 21. When the lever has arrived at the other end of its travel, (shown in Fig. 9), the platform will have been pushed to the left, to the extent in said figure. In the intermediate position (Fig. 8), in which lever 16 is vertical, the roller 11 is above gap 32 which necessarily exists between the elevator and the fixed frame work; this roller does not therefore rest on any rail. But the platform is supported since the driving pin or finger 21 rests on the bottom of the fork 17. The position of this fork on the lever 16 is moreover such that the said lever passes through the vertical position, the platform is slightly raised, for the purpose of facilitating the passage of the roller 11 onto the fixed rail 5 which is moreover provided with a small inclined ramp shown at 33.

After having reached the position of Fig. 9, and before starting on its return stroke, the lever 16 descends slightly (see the kinematic lines in Fig. 11), so that the fork 17 becomes completely disengaged from the finger 21. The lever returns then empty and with an accelerated speed, to the position of Fig. 7, where it now engages the next finger 22 (see Fig. 10).

During the next cycle, this finger 22 will be moved to the left, which movement will be succeeded in the third cycle by the movement of the finger 23. The platform is now completely trans-shipped or transferred to the fixed rails 5, and entirely removed from the elevator car. A suitable device could be provided for automatically stopping the motor at this moment.

With reference to Fig. 10 it should be pointed out that in the bottom vertical position of the lever 16, the end of the fork 17 must be at a lower level than the level of the driving fingers so that it will not interfere with the movement of the platform.

The return of the platform takes place in the same manner, but in reverse direction; it suffices to reverse the direction of rotation of the motor. When it is desired to trans-ship the platform to the rails 5 which are at the right hand side of the elevator in to Fig. 5, the clutch 27 will be operated so as to drive the shaft 13, the shaft 12 remaining at rest.

The described mechanism is of course intended to remove the platforms, in the same way, from the storage rooms or storage chambers 7 and 8 and to return them thereto.

The modified construction shown in Fig. 14 differs from the construction of Figs. 5 and 6 merely in that the rollers 11, instead of being secured to the platform, are secured to the elevator car as well as to the joists 5.

In order to lock the platform in its position of rest an automatic locking device could be provided, or still more simply, shallow notches or recesses, such as 34 (Fig. 15) provided in the rails. In the same way, in order to prevent the cars from shifting from the platforms during or after the manœuvers, recesses or seats 35 (Fig. 15ª) would be provided for receiving the wheels.

The advantages of the invention will be readily understood. The operation of the device is very simple; for garaging a car it suffices, when the elevator is at the bottom of the frame work, to get a platform from one of the storage spaces 7 or 8, to bring the said platform to the ground level in the compartment 3' for the incoming cars, and to push the car into it. The platform with the car is thereupon moved into the elevator car, the latter goes up and then the platform with the car is deposited on the desired floor; the elevator car then descends empty. After a car has been brought down, the platform will be housed until the return of the car to the garage.

What we claim is:

1. In an appliance for housing motor cars, a frame work comprising an elevator shaft and two flanking portions, each divided by floors into superposed compartments, a pair of rails on each floor leading to said elevator shaft, storage rooms in the basement of said frame work on either side of said elevator shaft, superposed pairs of rails in said storage rooms leading to said elevator shaft, movable platforms on said rails in said storage rooms, an elevator car, and a means for moving said elevator car up and down in said elevator shaft.

2. In an applicance for housing motor cars, a frame work comprising two opposed portions, vertical rows of superposed compartments formed in said portions, a pair of rails on the floor of each compartment leading to the center of said frame work, a central elevator shaft disposed between said opposed portions, an elevator car in said shaft, means for moving said elevator car up and down therein, a pair of rails traversing the floor of said elevator car and spaced apart equal to the spacing of the rails in said compartments, a movable platform in said elevator car, rollers supporting said platform upon the rails therein, and means for transferring said platform to and from the rails in said compartments.

3. In an appliance for housing motor cars, a frame work comprising two opposed portions, two vertical rows of superposed compartments formed in said portions, a pair of rails on the floor of each compartment leading to the center of said frame work, a central elevator shaft between said opposed portions, a storage room at the bottom of said frame work on either side of said elevator shaft, superposed pairs of rails in said storage rooms leading to said elevator shaft, an elevator car in said shaft open at two opposite ends, means for moving said car up and down in said shaft, a pair of rails traversing the bottom of said elevator car and leading to said shaft, said rails being spaced apart equal to the spacing of the rails in said compartments, a movable platform in said elevator car, rollers supporting said platform upon the rails in said car, and means for transferring said platform to and from said compartments and storage rooms.

4. In combination with an elevator shaft, a structure provided on either side of said shaft and divided by floors into superposed compartments, a pair of rails at the bottom of each compartment leading to said elevator shaft, an elevator car open at two opposite ends, a pair of rails in said car spaced equally to the rails in said compartments, means for moving said elevator car up and down in said shaft, a movable platform placed on rails in said elevator car, and means for transferring said platform from said elevator car to said compartments, and vice versa.

5. In combination with an elevator car open at two opposite ends, a movable platform, rails in said elevator car for supporting said platform, means for transferring said platform from said elevator car onto stationary rails provided in an upright structure, said transferring means comprising two groups of operating pins provided on either side of said platform, a pair of rocking levers at each end of said elevator car and having each an upper forked end adapted to engage said operating pins and a lower slotted end, a fixed pin engaging the slotted end, a pair of shafts extending across the floor of said elevator car at both ends thereof, cranks keyed to the ends of said shafts, a crank pin provided in the end of each of said cranks and pivoted each to one of said rocking levers between the upper forked end and the lower slotted end, and means for rotating said shaft.

6. In combination with an elevator car open at two opposite ends, a platform movable on rails provided on the floor of said car, and a mechanism for transferring said platform from said elevator car onto stationary rails provided in an external structure, said transfer means comprising two groups of operating pins on either side of said platform, a pair of rocking levers provided at each end of said elevator car and having an upper forked end engaging with said operating pins and a lower slotted end, a fixed pin engaging said slotted end, a pair of shafts extending across the floor of said elevator car at both ends thereof, cranks keyed to the ends of said shafts, a crank pin provided at the end of each of said cranks and pivoted to one of said rocking levers between the upper forked end and the lower slotted end thereof, and means for rotating said shafts, said means comprising two pairs of bevelled gears and two independent countershafts disposed at right angles to said first mentioned shafts, a double magnetic clutch alternately controlling each of said countershafts, and a reversible electric motor in connection with said magnetic clutch.

In testimony whereof we have affixed our signatures.

LUCIEN CUVILLIER.
HUBERT STERN.